United States Patent
Johnson

(10) Patent No.: US 10,542,442 B2
(45) Date of Patent: Jan. 21, 2020

(54) DOMINANCE-BASED COVERAGE MANAGEMENT FOR WIRELESS COMMUNICATION NETWORK

(71) Applicant: T-Mobile USA, Inc., Bellevue, WA (US)

(72) Inventor: Eric Johnson, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/422,878

(22) Filed: May 24, 2019

(65) Prior Publication Data

US 2019/0380046 A1 Dec. 12, 2019

Related U.S. Application Data

(60) Provisional application No. 62/682,733, filed on Jun. 8, 2018.

(51) Int. Cl.
*H04W 16/00* (2009.01)
*H04W 16/28* (2009.01)
*H04W 24/02* (2009.01)

(52) U.S. Cl.
CPC ........... *H04W 16/28* (2013.01); *H04W 24/02* (2013.01)

(58) Field of Classification Search
CPC ............................. H04W 16/28; H04W 24/02
See application file for complete search history.

(56) References Cited

U.S. PATENT DOCUMENTS

| | | | |
|---|---|---|---|
| 6,141,565 A | 10/2000 | Feuerstein et al. | |
| 9,578,530 B2 | 2/2017 | Gopalakrishnan et al. | |
| 9,706,411 B2 | 7/2017 | Goswami et al. | |
| 10,098,007 B2 | 10/2018 | Chandrasekaran et al. | |
| 2006/0239224 A1* | 10/2006 | Borst | H04W 16/04 370/329 |
| 2009/0132674 A1 | 5/2009 | Horn et al. | |
| 2011/0009105 A1 | 1/2011 | Lee et al. | |
| 2011/0244853 A1 | 10/2011 | Sheikh et al. | |
| 2012/0155428 A1 | 6/2012 | Bovo et al. | |
| 2012/0184280 A1* | 7/2012 | Hunukumbure | H04W 24/02 455/446 |
| 2013/0170362 A1 | 7/2013 | Futaki et al. | |
| 2014/0376390 A1 | 12/2014 | Kreher et al. | |

(Continued)

OTHER PUBLICATIONS

PCT Patent Application No. PCT/US2019/036173, Search Report and Written Opinion dated Oct. 2, 2019, 11 pages.

*Primary Examiner* — Khai M Nguyen
(74) *Attorney, Agent, or Firm* — Han Santos, PLLC

(57) ABSTRACT

An example method is performed by a computing device for determining one or more tilt adjustments for cells included in a wireless communication network. The method includes receiving geo-located traffic data that includes a signal strength of a serving cell and a signal strength of a neighbor cell. The computing device then determines a number of occurrences that the neighbor cell has a signal strength greater than the serving cell based on the geo-located traffic data, and if the number of occurrences is greater than a dominance threshold, compares the signal strength of the serving cell with a signal strength threshold. A coverage adjustment is then generated that includes instructions to adjust a tilt angle of an antenna included in one or more of the serving cell or the at least one neighbor cell.

21 Claims, 7 Drawing Sheets

(56) References Cited

U.S. PATENT DOCUMENTS

| | | | |
|---|---|---|---|
| 2015/0011227 A1* | 1/2015 | Wellington | H04W 24/02 455/446 |
| 2015/0141027 A1 | 5/2015 | Tsui et al. | |
| 2016/0057634 A1 | 2/2016 | Sugahara et al. | |
| 2016/0165472 A1* | 6/2016 | Gopalakrishnan | H04W 24/10 455/67.11 |
| 2017/0150365 A1 | 5/2017 | Goswami et al. | |
| 2017/0257787 A1* | 9/2017 | Regueira Caumel | H04W 24/02 |
| 2018/0049039 A1 | 2/2018 | Chandrasekaran et al. | |

* cited by examiner

DOMINANCE-BASED COVERAGE MANAGEMENT FOR WIRELESS COMMUNICATION NETWORK

CROSS-REFERENCE TO RELATED APPLICATION

This application claims the benefit of U.S. Provisional Application No. 62/682,733, entitled "DOMINANCE-BASED COVERAGE MANAGEMENT FOR WIRELESS COMMUNICATION NETWORK," filed Jun. 8, 2018 and expressly incorporated herein by reference in its entirety.

BACKGROUND

Mobile devices are integral to the daily lives of most users. Wireless communication devices are used to make voice calls, check email and text messages, update social media pages, stream media, browse websites, and so forth. As a result, users of mobile devices expect a wireless telecommunication carrier to provide constant and reliable telecommunication and data communication services at all times.

Mobile devices and communication networks facilitate the collection and exchange of information. Utilizing a wireless communication network and relevant communication protocols, a mobile device can engage in communications with a wide variety of computing devices. In accordance with a telecommunication environment, telecommunication devices, such as mobile terminals, establish connections with various computing devices via a wireless communication network provided by a wireless communication service provider.

Wireless communication networks include infrastructure equipment, often referred to as base stations or cell sites that transmit and receive radio signals with mobile devices or other wireless capable devices. A service provider can install infrastructure equipment geographically within a larger area such that the range of wireless communications may have some overlap and may resemble a pattern such as a set of overlapping cells. The geographic area for which individual infrastructure equipment can receive and transmit radio communications to various mobile devices is known as the coverage of the individual infrastructure equipment, and the quantity of devices or the data throughput that the individual infrastructure equipment can support within its geographic area may be considered the capacity of the individual infrastructure equipment. Within a defined range of individual infrastructure equipment, mobile devices may experience a different quality of radio signal communications according to the amount of power used for radio transmissions by the individual infrastructure equipment, the orientation and capabilities of antennas, the terrain, buildings, interfering signals from other infrastructure equipment or other devices, and various features that affect radio wave propagation. To deliver service across a large geographic region, wireless communication service providers may maintain networks of cells with overlapping coverages and capacities.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
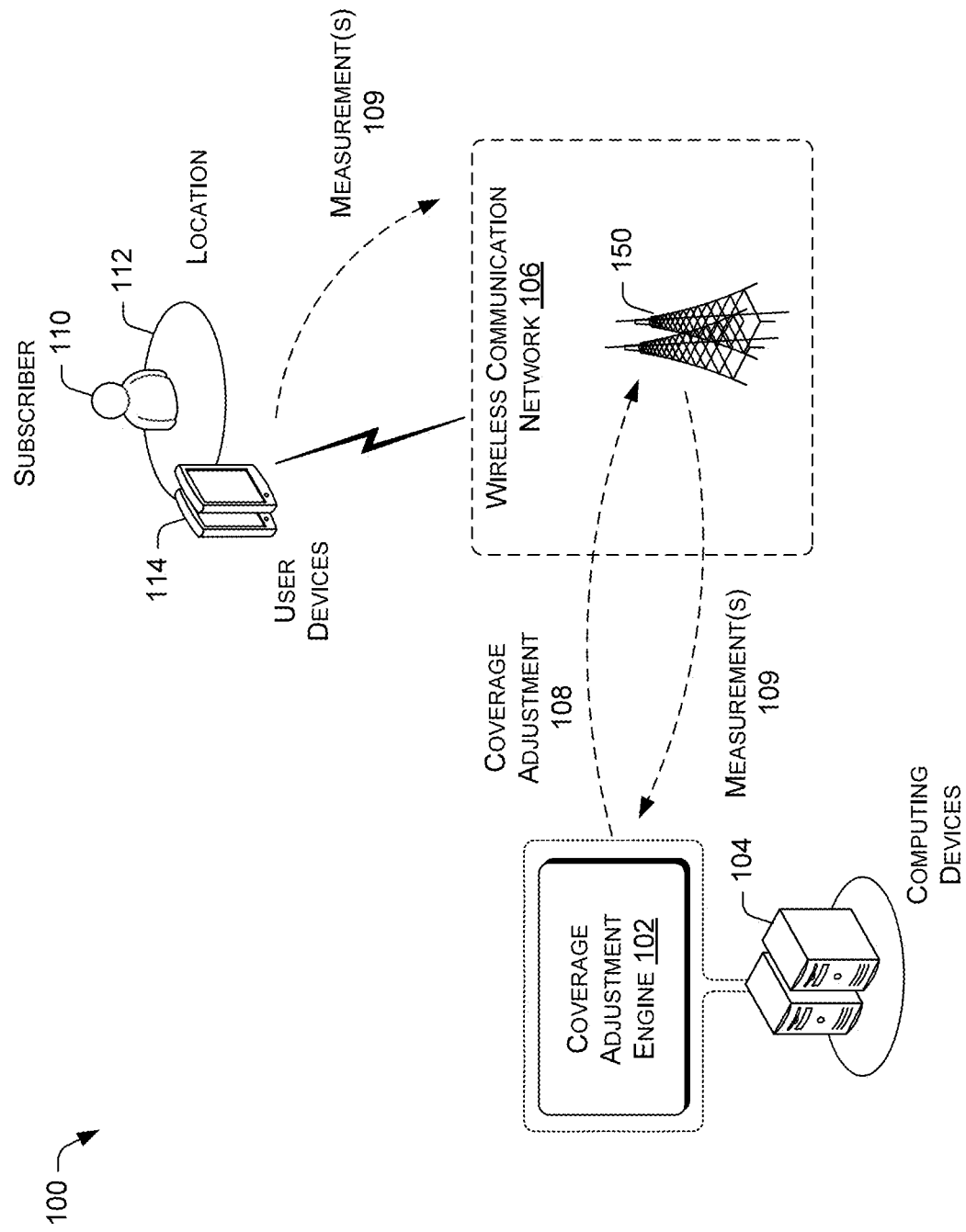
FIG. 1 illustrates an example architecture for deploying a coverage adjustment engine.

Aspects of the present disclosure are directed to the management of radio communications coverage in a wireless communication network. More specifically, aspects of the present disclosure may relate to systems and methods for dominance-based coverage adjustments in a wireless communication network based on geolocated traffic data of the wireless communication network.

Geolocated traffic data may include information regarding one or more aspects of traffic data associated with one or more identifiable geographic locations. Examples of traffic data information can include wireless signal information associated with individual infrastructure equipment that serves or otherwise affects the geographic location. In one aspect, traffic data includes information regarding traffic at particular geographic locations (e.g., latitude-longitude coordinates). In another aspect, the traffic data may include cell site information or wireless signal information (e.g., strength, quality, or signal noise ratio) associated with one or more cells that serve or otherwise affect a geographic location. In yet another aspect, the geolocated traffic data may include information collected regarding a measured performance (e.g., wireless signal and communication measurements collected by specialized car-mount or mobile equipment at various locations), records (or metadata) of phone calls made from a telecommunication device at particular locations, or records (or metadata) that a telecommunication device downloaded a quantity of data while utilizing the wireless communication network at a particular location.

In some embodiments, the geolocated traffic data may be collected from the telecommunication (i.e., user) devices or otherwise from the service provider's wireless communication network. In other embodiments, the geolocated traffic data may be collected from, e.g., social media networks, customer care systems, or other sources. In some embodiments, the geolocated traffic data may include timestamps or other information regarding the communication traffic.

However, the available geolocated traffic data is voluminous. That is, the large amount of available geolocated traffic data may prevent, or at least, delay the responsiveness of an administrator to recognize and/or respond to network issues. Accordingly, aspects of the present disclosure include a coverage adjustment engine that collects the geolocated traffic data associated with one or more geographic coverage areas served by infrastructure equipment of the provider's wireless communication network and provides dynamic coverage adjustments to one or more cells based on the geolocated traffic data.

The coverage adjustment engine may further collect data regarding the wireless communication network. Such data may include, for example, locations of cell sites of the wireless communication network, orientation and capabilities of cell site antennas, intended or designed cell coverage, cell site capacities, subscriber and business locations, or the like.

To achieve improved performance of the wireless communication network (e.g., well defined cell coverage boundaries for optimal cell coverage and capacity, reduction of "boomer" cells for optimal inter-cell interference, or the like), the coverage adjustment engine may seek to identify areas in the current coverage among various cells that lack sufficient dominance by using the collected geolocated traffic data.

In some aspects, a low-dominance area of the wireless communication network refers to a geographic area where the receive level of the serving cell is similar to or weaker than the receive levels of its neighboring cells. Thus, the receive levels of downlink signals between different cells may be close to cell reselection thresholds. In some examples, an area without a dominant cell can also be regarded as a weak coverage area.

FIG. 1 illustrates an example architecture 100 for deploying a coverage adjustment engine 102. The coverage adjustment engine 102 may execute on one or more computing devices 104. The computing devices 104 may include general purpose computers, such as desktop computers, tablet computers, laptop computers, servers, and so forth. However, in other embodiments, the computing devices 104 may include smartphones, game consoles, or other electronic devices that are capable of receiving inputs, processing the inputs, and generating output data. In various embodiments, the computing devices 104 may be operated by a wireless telecommunication carrier or a third-party entity that is working with the wireless telecommunication carrier.

The coverage adjustment engine 102 may provide one or more recommended coverage adjustments 108 for remedying a network coverage problem. The network coverage problem may be experienced by a subscriber 110 at a location 112 while using one or more user devices 114. The one or more user devices 114 may be experiencing the network coverage problem while using services provided by the wireless communication network 106. In various embodiments, each of the user devices 114 may be a smartphone, a feature phone, a tablet computer, or another type of communication device. The location 112 may be a residential address, a business address, a set of geographical coordinates, and/or the like. The coverage adjustment 108 may include implementation of increasing (e.g., by uptilting) the coverage area of a serving cell included in cell sites 150 and/or decreasing (e.g., by downtilting) the coverage area of a neighbor cell included in the cell sites 150.

In various embodiments, the coverage adjustment engine 102 may generate the one or more coverage adjustments 108 for the network coverage problem at the location 112 based on measurements 109. Measurements 109 may include one or more measurements taken by the user devices 114 regarding the signal strength of a serving cell as well as one or more neighbor cells while the user device 114 is at location 112. Signal strength may be measured via received signal strength indicator (RSSI), reference signal received power (RSRP), received channel power indicator (RCPI), or other measurements. In some aspects, the measurements 109 may also include an indication of signal quality. Signal quality may be measured through energy to interface ratio (ECIO), reference signal received quality (RSRQ), signal to interference-plus-noise ratio (SINR), or other measurements.

In one example, the coverage adjustment engine 102 may correspond to a single computing device 104 in the architecture 100. In other examples, the coverage adjustment engine 102 is embodied in a plurality of computing devices 104, each implementing some functionality of the coverage adjustment engine 102. The computing devices 104 (e.g., a server) may include memory, processing units, and computer-readable medium drive(s), all of which may communicate with one another by way of a communication bus. The computing device 104 may include network interface(s) that provide connectivity over the wireless communication network 106, and/or other networks (e.g., the internet) or computer systems.

With continued reference to FIG. 1, the architecture 100 may include a number of user devices 114, each associated with a subscriber 110. The user devices 114 may correspond to a wide variety of devices or components that are capable of initiating, receiving or facilitating communications over a communication network including, but not limited to, personal computing devices, electronic book readers (e.g., e-book readers), handheld computing devices, integrated components for inclusion in computing devices, home electronics, appliances, vehicles, machinery, landline telephones, network-based telephones (e.g., voice over IP ("VoIP")), cordless telephones, cellular telephones, smartphones, modems, personal digital assistants, laptop computers, gaming devices, media devices, and the like. In an illustrative embodiment, the user devices 114 may include a wide variety of software and hardware components for establishing communications over one or more communication networks, including the wireless communication network 106, a wired communication network (not shown), or an IP-based telecommunication network (not shown).

Although the wireless communication network 106 is illustrated as a single communication network, one skilled in the relevant art will appreciate that the communication network can be made up of any number of public or private communication networks and/or network connections. The wireless communication network 106 can include a network of cell sites 150 located in different geographic locations, each having an intended or designed coverage area.

A user device 114 within the coverage area of a cell site can connect to infrastructure equipment of the cell site and communicate over the wireless communication network 106 in accordance with any one of a number of wireless telecommunication interfaces. As mentioned above, the user device 114 may generate measurements 109 when communicating via the wireless communication network 106. In some aspects, the measurements 109 generated by the user devices 114 are incorporated into geo-located traffic data. For example, geo-locations may be calculated from measurements and network topology of the wireless communication network 106. Alternatively, or concurrently, the geo-locations may be collected from GPS measurements supplied by the user devices 114. Illustratively, the user device 114 may be equipped with GPS or other geolocation tracking functionality, which may correlate geolocation of the device (e.g., latitude-longitude coordinates) with communications via the wireless communication network 106, such as during an attempt to establish a communication channel, a voice call or data session, a handover of communication between cells, or the like.

In some aspects, the wireless communication network 106 may include a number of additional components, systems and/or subsystems for facilitating communications with the user devices 114 and the coverage adjustment engine 102. The additional components can include one or more switching centers (not shown) for establishing communications with the user devices 114 via the wireless communication network 106, such as a cellular radio access network incorporating one or more wireless air interface standards promulgated by a standards organization, such as air interface protocols based on code division multiplex access (CDMA), time division multiple access (UEMA), global system for mobile communications (GSM), wireband code division multiplex access (WCDMA), code division multiplex access 3rd generation (CDMA2000), time division synchronous code division multiple access (UE-SCDMA), wavelength and time division multiple access (WUEMA), long term evolution (LTE), orthogonal frequency division multiple access (OFDMA), IEEE 802.11 technical standards ("WiFi"), IEEE 802.16 standards ("WiMax"), Unlicensed Mobile Access ("UMA"), General Access Network ("GAN"), or other technologies.

Figure 2:
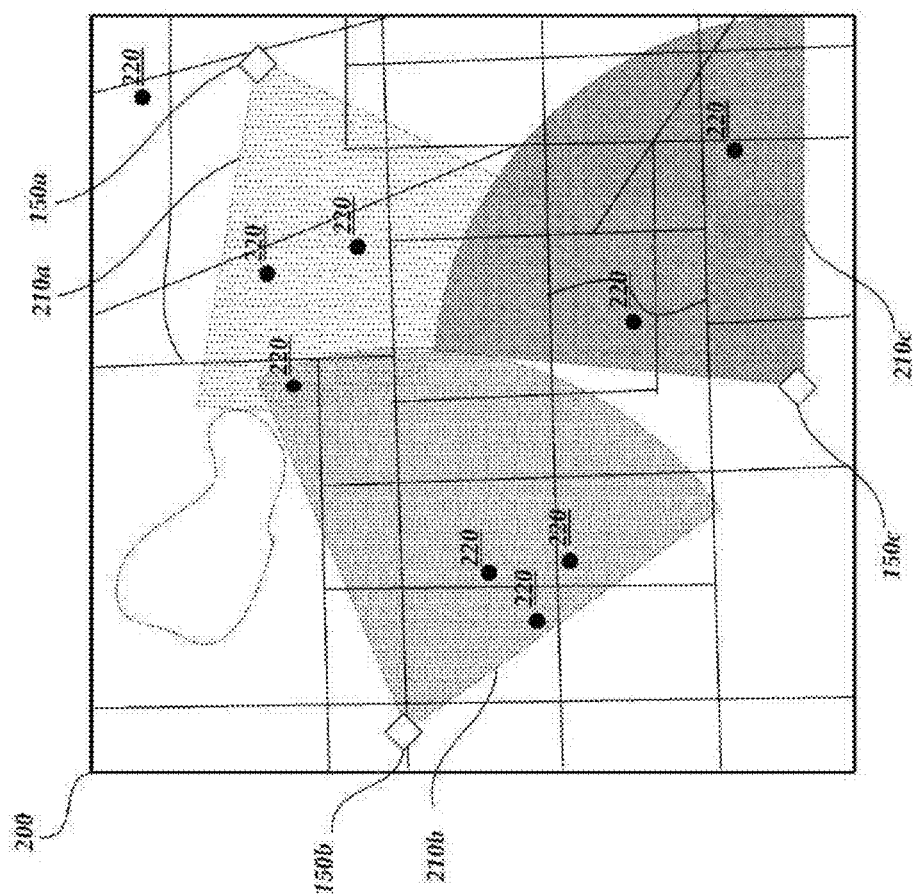
FIG. 2 is a diagram illustrating geo-located traffic in relation to cell sites.

FIG. 2 is an illustrative diagram 200 depicting geolocated telecommunication traffic in relation to cell sites 150 in the illustrative architecture 100 of FIG. 1. The diagram 200 illustrates cell sites 150 and a plurality of specific geographic locations, generally referred to as telecommunication traffic data points 220 overlaid on at least a partial map of streets and city blocks. As will be explained in greater detail, individual telecommunication traffic data points 220 will be utilized as a basis to establish associations between various geographic locations and the coverage areas (or cells) served by individual infrastructure equipment (e.g., e-node B's, cell stations, base stations, and the like). As previously discussed, cell sites 150a, 150b, and 150c can be associated with their respective coverage areas 210a, 210b, and 210c. Illustratively, the coverage areas 210 represent anticipated or actual radio transmission coverage areas based on the placement of corresponding cell site infrastructure equipment within the wireless communication network 106. The coverage areas 210a, 210b, and 210c may be modeled based on actual parameters of the individual infrastructure equipment or measured performance thereof.

As illustrated in FIG. 2, cell coverage areas 210a, 210b, and 210c overlap with one another in some portions. In some embodiments, certain individual infrastructure equipment may be associated with multiple coverage areas (e.g., multiple cells) that are oriented differently and implement the same or different network standards or technologies. Telecommunication traffic data points 220 may correspond to a snapshot of a user device 114 communicating or attempting to communicate via the wireless communication network 106 at a specific time or during a specific period of time. Each data point 220 can include geographic location and can be projected onto the diagram 200 based on geographic location information (e.g., latitude-longitude coordinates, street address, etc.) of the data point. As can be seen in FIG. 2, data points 220 may be located outside any cell coverage area, within an area with overlapping coverage from multiple cells, or within a single cell coverage area. As previously discussed, each data point 220 may include cell site information or wireless signal information (e.g., strength, quality, or signal noise ratio) associated with one or more cells that serve or otherwise affect the geographic location of the data point.

Figure 3:
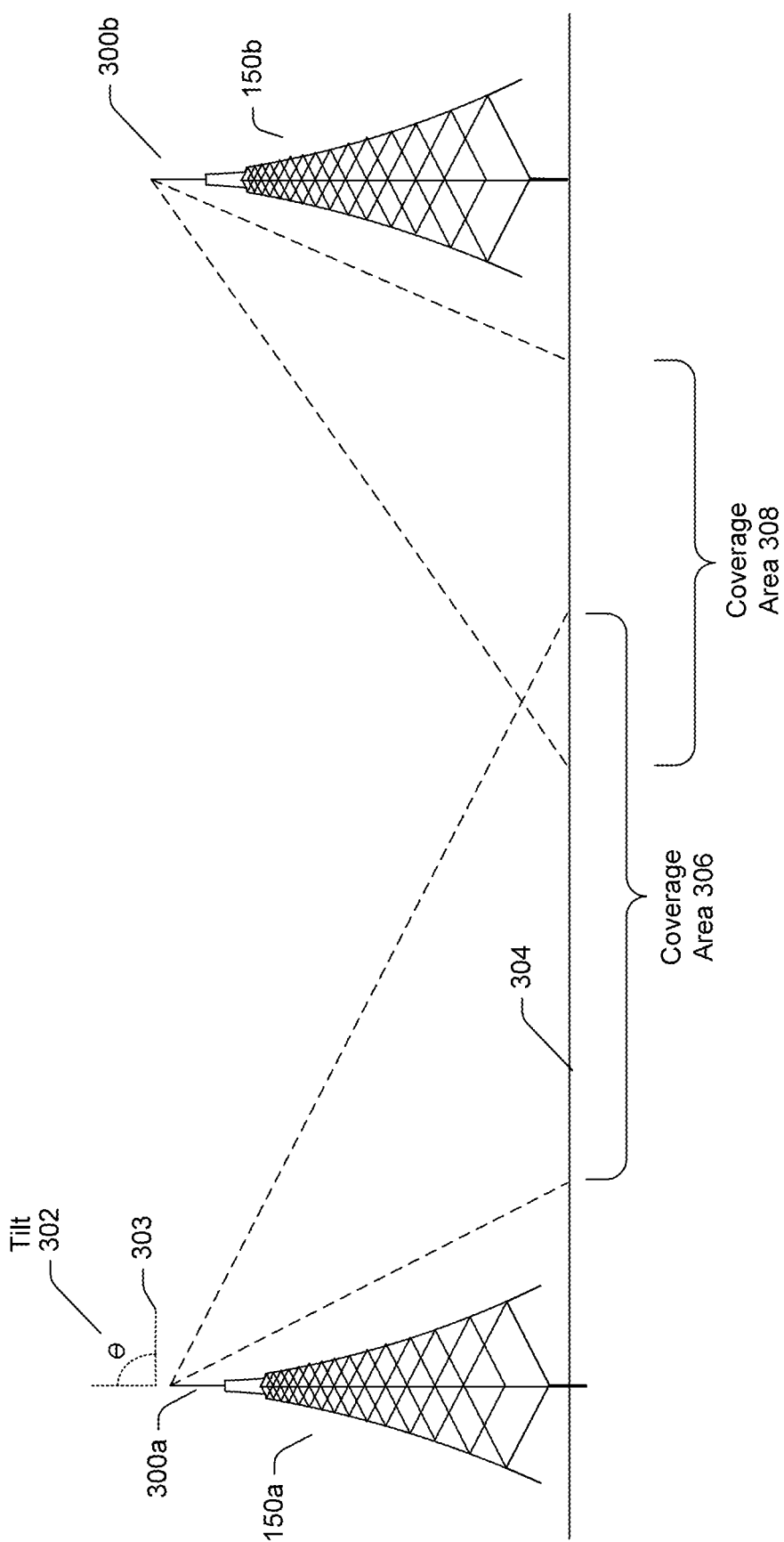
FIG. 3 is a diagram illustrating a tilt angle of an antenna and associated coverage area of a cell site.

FIG. 3 is a diagram illustrating a tilt angle 302 of an antenna 300a and associated coverage area 306 of a cell site 150a. Also shown is an antenna 300b and associated coverage area 308 of a cell site 150b. In some aspects, the coverage area provided by a particular cell site is dictated, in part, based on the tilt angle of an antenna included in the cell site. In some implementations, the tilt angle 302 of antennas 300a and/or 300b is adjustable, either by way of manual adjustment by a technician, or electronically by way of an electrically actuated motor (not shown) that is affixed to the antenna. As will be described in further detail below, the tilt angle 302 may be adjusted based on one or more coverage adjustments 108 generated by the coverage adjustment engine 102 of FIG. 1. In some examples, the tilt angle 302 is with respect to a reference 303 (e.g., see the example in FIG. 3 where reference 303 is substantially parallel to horizon 304). Accordingly, in the example of FIG. 1, the tilt angle 302 may represent how far the angle of antenna 300a is from a plane parallel to horizon 304. Thus, a coverage adjustment 108 that includes instructions to uptilt antenna 300a may increase the tilt angle 302. Similarly, a coverage adjustment 108 that includes instructions to downtilt antenna 300a may decrease the tilt angle 302.

Of course, in other examples, a different reference 303 may be utilized. That is, reference 303 may be a plane perpendicular to horizon 304, where the tilt angle 302 represents how far the antenna 300a is from a perpendicular to the ground.

Figure 4:
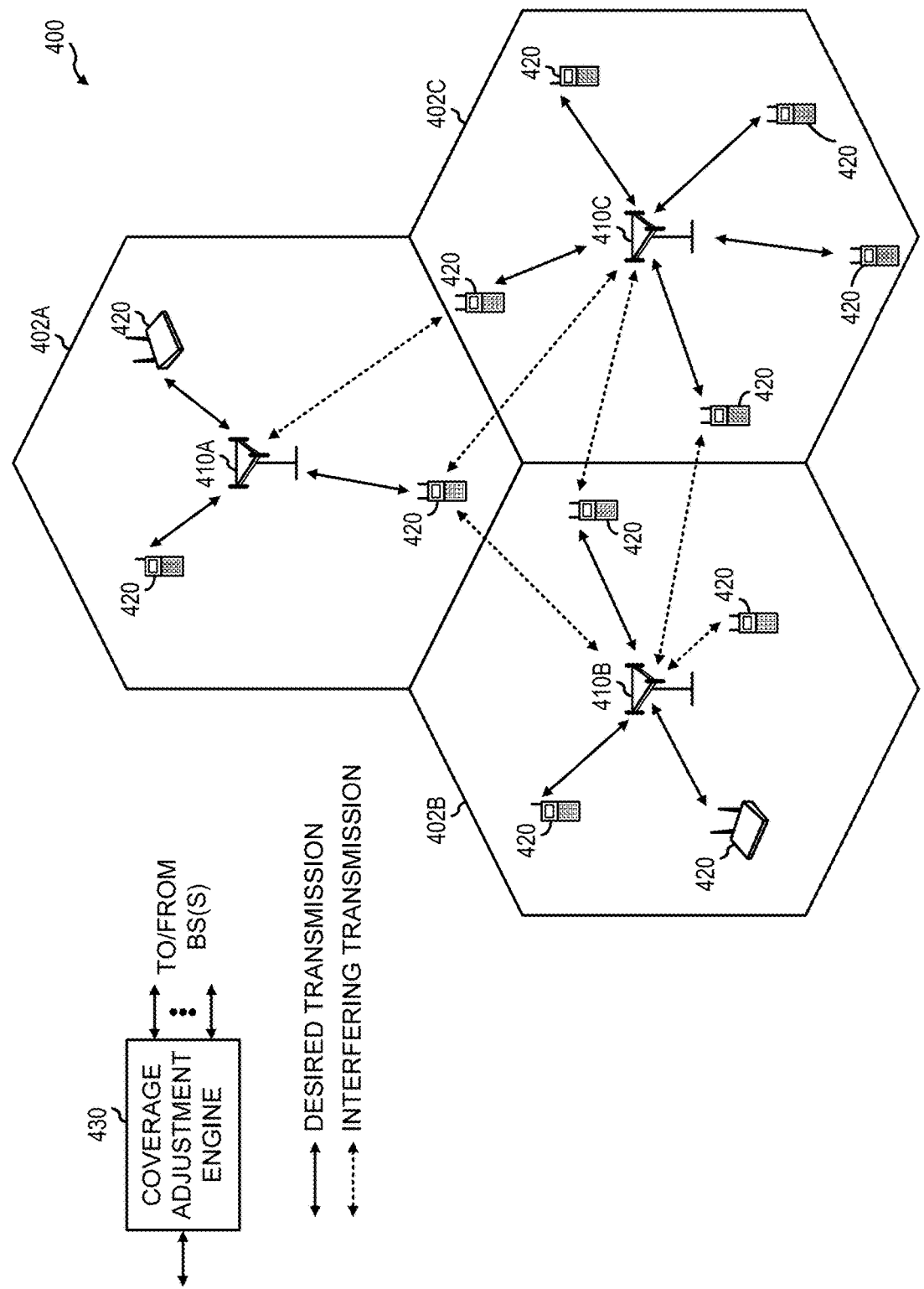
FIG. 4 illustrates an example wireless communication system environment in which the teachings and structures herein may be incorporated.

FIG. 4 illustrates an example communication system environment in which the teachings and structures herein may be incorporated. The wireless network 400, which will be described at least in part as an LTE network for illustration purposes, includes a number of eNBs 410 and other network entities. Each of the eNBs 410 provides communication coverage for a particular geographic area, such as macro cells 402.

In the illustrated example, the eNBs 410A, 410B, and 410C are macro cell eNBs for the macrocells 402A, 402B, and 402C, respectively. The macrocells 402A, 402B, and 402C may cover a relatively large geographic area (e.g., several kilometers in radius) and may allow unrestricted access by UEs with a service subscription. In some aspects, each macrocell 402A-C may be further divided into one or more sectors.

In one example, the wireless network 400 is a heterogeneous network in that it includes eNBs of different types, including macro eNBs, pico eNBs, femto eNBs, relays, etc. These different types of eNBs may have different transmit power levels, different coverage areas, and different impacts on interference in the wireless network 400. For example, macro eNBs may have a relatively high transmit power level whereas pico eNBs, femto eNBs, and relays may have a lower transmit power level (e.g., by a relative margin, such as a 10 dBm difference or more).

The wireless network 400 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

The coverage adjustment engine 430 is one possible example of coverage adjustment engine 102 of FIG. 1 and may couple to a set of eNBs (e.g., base stations "BSs") and provide coordination and control for these eNBs. The coverage adjustment engine 430 may communicate with the eNBs 410 via a backhaul. The eNBs 410 may also communicate with one another, e.g., directly or indirectly via a wireless or wireline backhaul.

As shown, the UEs (i.e., user equipment/user devices) 420 may be dispersed throughout the wireless network 400, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 4, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. In some examples, the interfering transmissions may prevent, or at least inhibit, the establishment of a communication channel between the UE and an eNB. In other examples, the interference transmissions may negatively effect the handover of a UE between eNBs (e.g., incorrect cell selection and/or premature/delayed handover).

Figure 5:
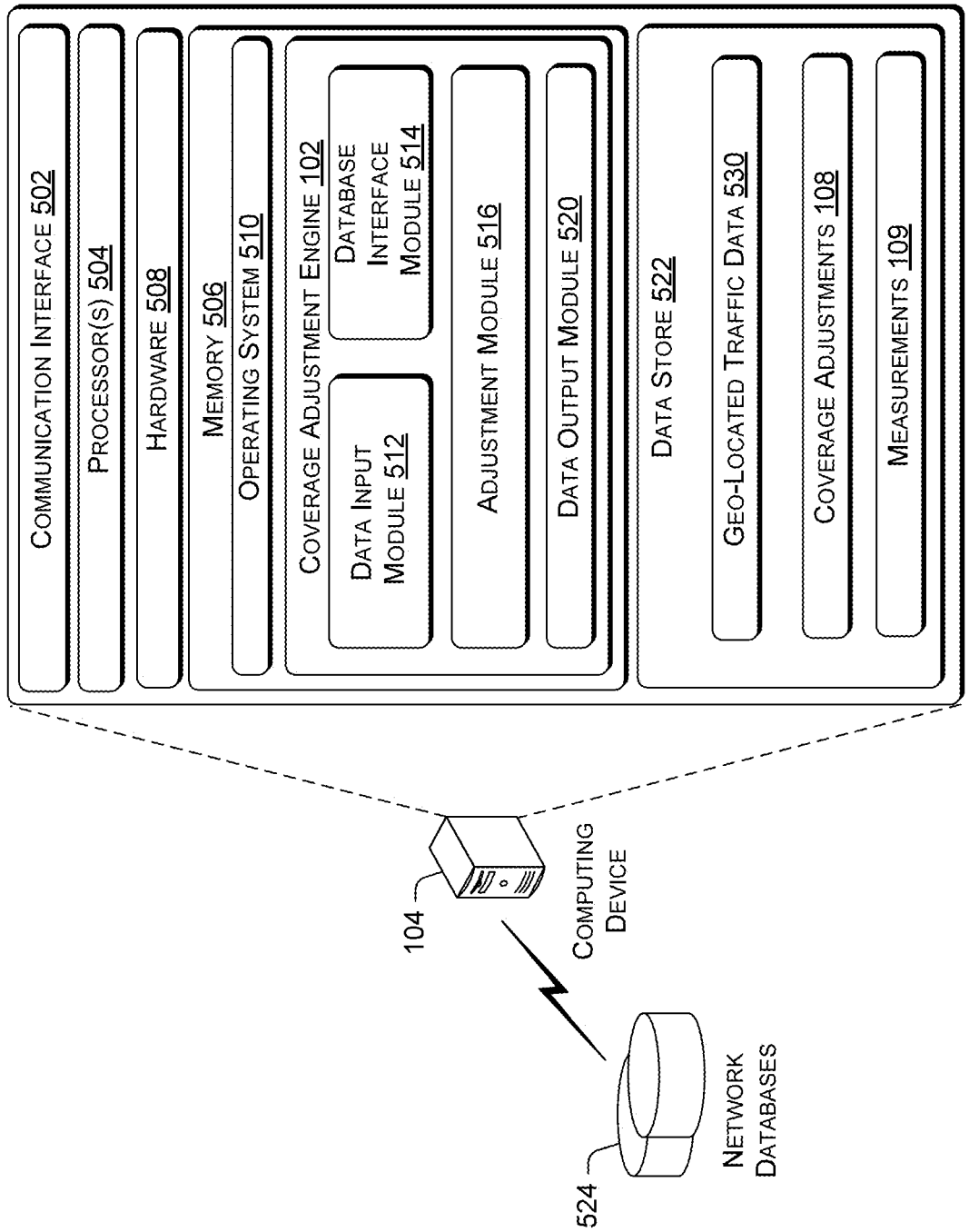
FIG. 5 a block diagram showing various components of one or more illustrative computing devices that implement the coverage adjustment engine.

FIG. 5 is a block diagram showing various components of one or more illustrative computing devices that implement the coverage adjustment engine. The computing devices 104 may include a communication interface 502, one or more processors 504, memory 506, and hardware 508. The communication interface 502 may include wireless and/or wired communication components that enable the server to transmit data to and receive data from other networked devices. The hardware 508 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 506 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 504 and the memory 506 of the computing devices 104 may implement an operating system 510 and the coverage adjustment engine 102. The operating system 510 may include components that enable the computing devices 104 to receive and transmit data via various interfaces (e.g., user controls, communication interface, and/or memory input/output devices), as well as process data using the processors 504 to generate output. The operating system 510 may include a presentation component that presents the output (e.g., displays the data on an electronic display, stores the data in memory, transmits the data to another electronic device, etc.). Additionally, the operating system 510 may include other components that perform various additional functions generally associated with an operating system.

The coverage adjustment engine 502 may include a data input module 512, a database interface module 514, an adjustment module 516, and a data output module 520. The modules may include routines, program instructions, objects, and/or data structures that perform particular tasks or implement particular abstract data types. The computing device 104 may also include a data store 522 that is used by the coverage adjustment engine 102. In some examples, data store 522 is included in memory 506. In various embodiments, the coverage adjustment engine 102 may be a stand-alone application or a web-based application.

The data input module 512 may receive geo-located traffic data 530 and/or measurements 109.

The database interface module 514 may interface with one or more network databases 524. The network databases 524 may include an engineering database where one or more network parameters are stored. For example, information such as the availability of spectrum licenses at the location, the availability of a PSAP for the location, the type and robustness of telecommunication carrier network signals that cover the location may be obtained from the engineering database. The types of the telecommunication carrier network signals may include Second Generation (2G), Personal Communication Service (PCS), Advanced Wireless Services (AWS), and/or so forth.

In various embodiments, the network database 524 may also store information on the locations of known network coverage problems, as well as locations, identities, and description of coverage devices that have been deployed to solve the known network coverage problems.

The network databases 524 may also include one or more device databases. The device databases may store device information on the user devices of the subscribers that are serviced by the wireless communication network 106. For example, the device information for a user device may include data on device features, device hardware and software specifications, device network compatibility, device configuration information, and/or so forth. In various embodiments, the device databases may include databases that are maintained by the wireless telecommunication carrier that operates the wireless communication network 106, databases that are maintained by a third-party device manufacturer, device databases that are maintained by a third-party device retailer, and/or so forth.

The adjustment module 516 may use adjustment algorithms to analyze the data that are obtained by the data input module 512 and the database interface module 514 with respect to a network coverage problem at a particular location. Accordingly, the adjustment module 516 may generate one or more adjustments (e.g., coverage adjustments 108) for remedying the network coverage problem. In various embodiments, the coverage adjustment 108 may include instructions for the uptilting and/or downtilting of a cell site antenna.

The data output module 520 may generate the various application user interfaces that are configured to receive data inputs and display information to a user. The application user interfaces may include user interfaces that request user identification information, address information, user device information, etc., as well as application user interfaces that provide the coverage adjustments.

The data store 522 may store information that is processed by the coverage adjustment engine 102. The information may include the geo-located traffic data 530 and the coverage adjustments 108. The data store 522 may also store the measurements 109 obtained via the data input module 512.

Figure 6:
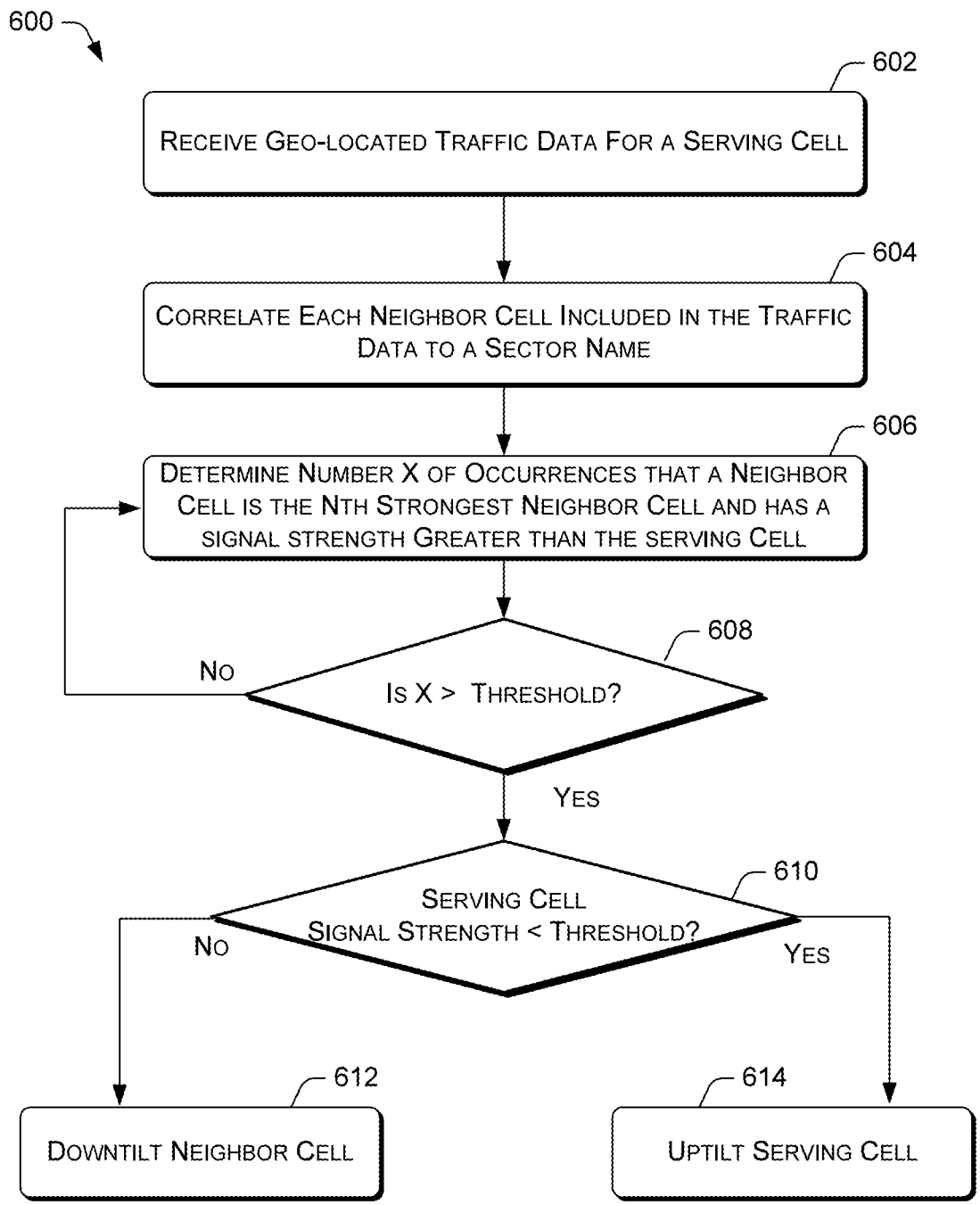
FIG. 6 is a flow diagram of an example process for determining one or more tilt adjustments for cell sites.

FIG. 6 is a flow diagram of an example process 600 for determining one or more tilt adjustments (e.g., coverage adjustments 108) for cell sites. Process 600 is one possible process performed by coverage adjustment engine 102 of FIG. 5.

At block 602, the coverage adjustment engine receives/obtains geo-located traffic data associated with the wireless communication network 106. As discussed above, data points included in the traffic data may be geolocated in that they contain information regarding traffic at particular locations (e.g., latitude-longitude coordinates, street address, etc.). The traffic data may include cell site information or wireless signal information (e.g., strength, quality, or signal noise ratio) associated with a serving cell as well as one or more neighbor cells.

Illustratively, the geo-located traffic data may include measurements of signal strength determined by a user device 114 while the user device 114 was at a location 112 during a call conducted by the user device 114. The geolocated traffic data may further include date and time information, user demographics, device characteristics, information about the location (e.g., altitude above sea level, proximity to a local business or point of interest, etc.), or any other information relevant to determining cell coverage.

The coverage adjustment engine 102 may obtain the traffic data at regular intervals (e.g., daily or hourly), and the obtained traffic data may be filtered to correspond to a specified period of time (e.g., the past 24 hours). In some embodiments, certain events (e.g., addition of new cell site(s), implementation of remedies aimed to cure cell coverage defects, or fluctuation of traffic that exceeds certain threshold) may trigger the coverage adjustment engine 102 to obtain geo-located traffic data.

As mentioned above, the geo-located traffic data may include measurements of signal strength of both a serving cell and of one or more neighbor cells. In one example, the geo-located traffic data includes measurements of signal strength of the serving cell and the signal strengths of the N (e.g., 3) strongest neighbor cells. For example, the geo-located traffic data may include the RSRP for the serving cell, the RSRP for the strongest neighbor cell, the RSRP for the second strongest neighbor cell, and the RSRP for the third strongest neighbor cell. In some examples, each neighbor cell in the geo-located traffic is identified by a cell identifier, such as a PCI (Physical Cell Identifiers). PCIs in LTE networks provide a pseudo-unique value for identifying eNodeBs. The PCI value is created from two components—PSS and SSS. The PSS, Primary Synchronization Signal, has the value 0, 1, or 2. The SSS, Secondary Synchronization Signal, can have a value between 0 and 167. The PCI value is [(3×SSS)+(PSS)], resulting in a value between 0 and 503. However, with only these 504 values, PCIs are reused within a wireless communication network 106. Accordingly, in process block 604, the coverage adjustment engine 102 correlates each neighbor cell identified in the geo-located traffic data to a sector name. In one aspect, this may include correlating the neighbor cell's PCI with the sector name. In one implementation, determining the sector name may include ranking multiple cells in the wireless communication network 106 that use the same PCI based on a calculated distance to the location associated with the traffic data point 220. That is, the coverage adjustment engine 102 may assume that the cell with the PCI that is closest to where the measurement 109 was obtained is indeed the cell site for the neighbor cell in question.

Thus, coverage adjustment engine 102 may calculate distance and/or orientation of telecommunication traffic data points 220 with respect to cell sites 150. As discussed above, telecommunication traffic data points 220 may correspond to one or more data points collected in the geolocated traffic data. In some embodiments, the coverage adjustment engine 102 may already have or may collect data regarding cell sites 150 of the wireless communication network 106. Such data may include, for example, the locations of cell sites 150 in the network, the orientation and capabilities of cell site antennas, the intended or designed cell coverage areas, cell site capacities, subscriber and business locations, or the like.

The coverage adjustment engine 102 may convert the location information associated with telecommunication traffic data points and cell sites into a standardized or otherwise comparable format (e.g., latitude-longitude coordinates, relative distance and orientation to a predefined landmark, etc.).

In block 606, the coverage adjustment engine 102 may analyze the traffic data to determine a number X of occurrences that a neighbor cell is the Nth strongest neighbor cell and had a signal strength that was greater than that of the serving cell. In some implementations, N is greater than one. For example, as mentioned above, the traffic data may include multiple traffic data points, where each traffic data point indicates: (1) the serving cell RSRP, (2) the strongest neighbor RSRP, (3) the second strongest neighbor RSRP, and (4) the third strongest neighbor RSRP. Thus, process block 606 may include determining the number of occurrences that the third strongest neighbor (i.e., N=3) has an RSRP that was greater than the RSRP of the serving cell.

In decision block 608, the coverage adjustment engine 102 compares the determined number X of occurrences against a dominance threshold. In one example, the dominance threshold utilized in decision block 608 represents a desired dominance for an area included in the wireless communication network 106. If the number X of occurrences is less than the dominance threshold, then process 600 may return to process block 606 to analyze a next neighbor cell included in the traffic data.

If, however, the number X of occurrences is equal to or greater than the dominance threshold, then process 600 proceeds to decision block 610 where the serving cell signal strength is compared against a signal strength threshold. In one example, the signal strength threshold determines whether the coverage area of the serving cell should be increased or whether the coverage area of the offending neighbor cell should be decreased. In one implementation, the signal strength threshold is −114 dBM.

If the signal strength of the serving cell is less than the signal strength threshold, then process block 614 includes generating an instruction (coverage adjustment 108) to uptilt the antenna of the serving cell (e.g., increasing the tilt angle 302 of antenna 300*a*). If the signal strength of the serving cell is equal to or greater than the signal strength threshold, then process block 612 includes generating an instruction to downtilt the antenna of the neighbor cell (e.g., decreasing the tilt angle 302 of antenna 300*b*).

Process 600 may then return to process block 606 to analyze a next neighbor cell included in the traffic data. In some examples, process 600 is performed on a regular, periodic basis (e.g., daily). Thus, in some aspects, the coverage adjustment engine 102 may make regular adjustments to the coverage areas provided by numerous cell sites 150 regardless of the intended coverage for a particular cell/sector.

Furthermore, in some examples, the adjustment to the tilt angle to a cell site may be a step change in tilt angle. That is, the adjustment to the tilt angle performed by process 600 for each cell site may be the same (e.g., 1 degree). For example, each time process 600 determines to uptilt a serving cell, the tilt adjustment may be limited to 1 degree. Similarly, each time process 600 determines to downtilt a neighbor cell, the adjustment may be limited to 1 degree. In addition, the coverage adjustment engine 102 may limit the number of adjustments made to a particular cell site in a certain time frame. For example, the coverage adjustment engine 102 may limit the adjustment to a tilt angle to a serving cell to 1 degree per day, regardless if there are numerous neighbor cells causing dominance/interference issues and/or regardless of the current signal strength of the serving cell.

Figure 7:
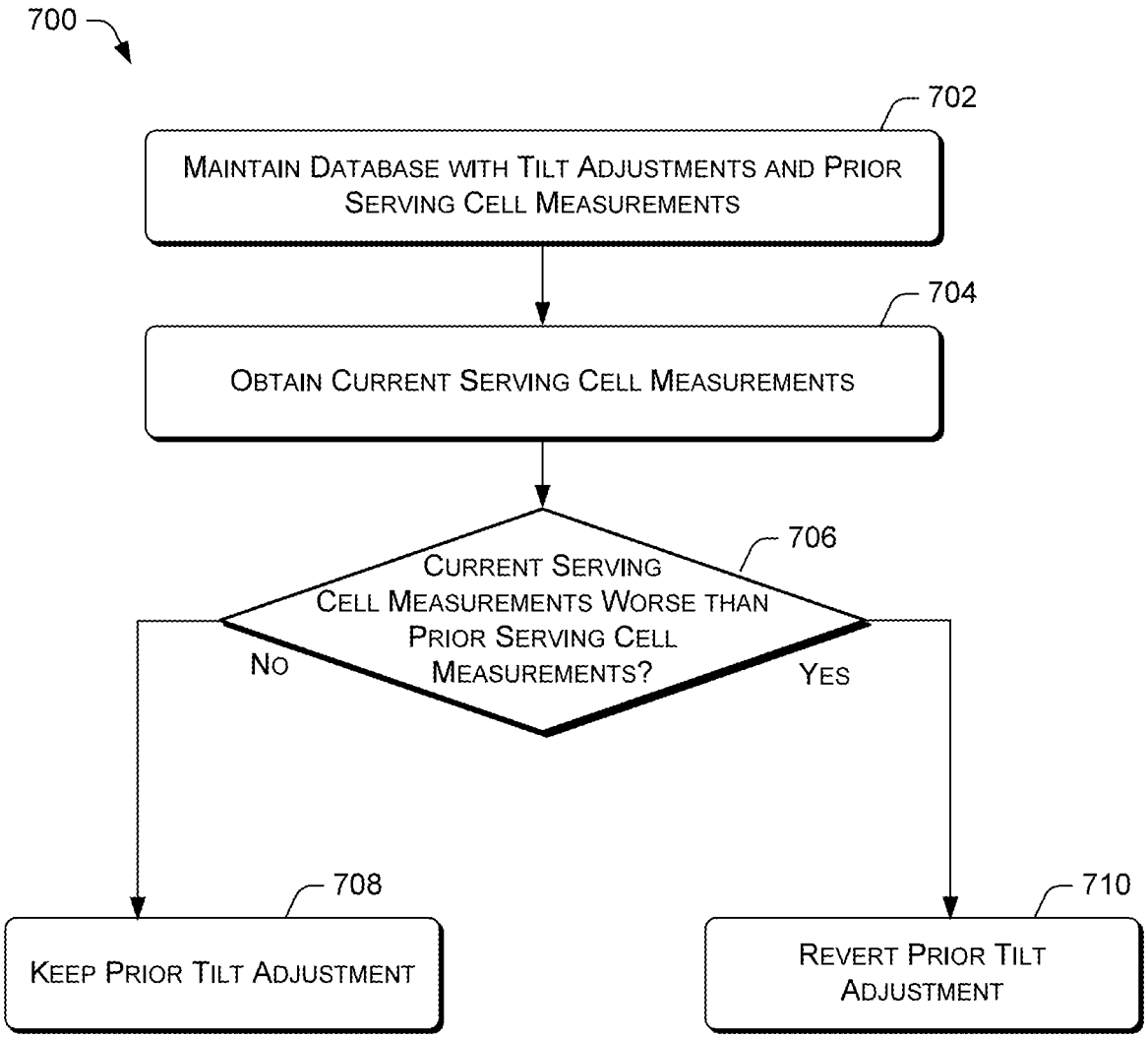
FIG. 7 is a flow diagram of an example process for reversing prior tilt adjustments made to cell sites.

FIG. 7 is a flow diagram of an example process 700 for reversing prior tilt adjustments made to cell sites. Process 700 is one possible process performed by coverage adjustment engine 102 of FIG. 1. In some instances, adjusting the coverage of a cell site may have unintended consequences and/or may not result in improved performance. Thus, process 700 represents one possible function performed by the coverage adjustment engine 102 of evaluating and/or remedying prior tilt adjustments. In a process block 702, the coverage adjustment engine 102 maintains a database (e.g., network database 524) with prior tilt adjustment and prior serving cell signal strength measurements (e.g., RSRP). In a process block 704, the coverage adjustment engine 102 obtains the current serving cell signal strength measurements (e.g., by way of geo-located traffic data). In decision block 706, the current serving cell signal strength measurements are compared against the prior signal strength measurements for the same cell site. If the current signal strength measurements are worse (e.g., less than) than the prior serving cell signal strength measurements, then process block 710 may include reversing the prior tilt adjustment (e.g., undoing the previous tile adjustment to tilt angle 302). Otherwise, process block 708 may include keeping or retaining the prior tilt adjustment at the cell site 150.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method of determining one or more tilt adjustments for cells included in a wireless communication network, the method comprising:
   receiving, at a computing device, geo-located traffic data associated with the wireless communication network, wherein the geo-located traffic data includes a signal strength of a serving cell and a signal strength of at least one neighbor cell of the wireless communication network;
   determining, at the computing device, a number of occurrences that the at least one neighbor cell has a signal strength greater than the serving cell based on the geo-located traffic data;
   comparing, by the computing device, the signal strength of the serving cell with a signal strength threshold in response to determining that the number of occurrences is greater than a dominance threshold; and
   generating, by the computing device, a coverage adjustment based on the comparing of the signal strength of the serving cell with the signal strength threshold, wherein the coverage adjustment includes instructions to adjust a tilt angle of an antenna included in one or more of the serving cell or the at least one neighbor cell.

2. The computer-implemented method of claim 1, wherein the geo-located traffic data includes one or more geo-located data points that includes a first signal strength measurement of the serving cell and a plurality of second signal strength measurements of a plurality of neighbor cells, wherein the first signal strength measurement and the plurality of second signal strength measurements are performed by a user device of the wireless communication network.

3. The computer-implemented method of claim 2, wherein the first signal strength measurement and the plurality of second signal strength measurements include a signal strength measurement selected from the group consisting of: a received signal strength indicator (RSSI), a reference signal received power (RSRP), and a received channel power indicator (RCPI).

4. The computer-implemented method of claim 2, wherein each neighbor cell included in the plurality of neighbor cells of the geo-located traffic data includes an associated cell identifier, and at least two of the neighbor cells have a same cell identifier, further comprising:
   correlating one of the two neighbor cells having the same cell identifier to a sector name of the wireless communication network.

5. The computer-implemented method of claim 4, wherein correlating the one of the two neighbor cells having the same cell identifier to the sector name includes determining which of the two neighbor cells are located closest to a respective geo-located data point of the geo-located traffic data.

6. The computer-implemented method of claim 4, wherein the associated cell identifier is a physical cell identifier (PCI).

7. The computer-implemented method of claim 1, wherein determining the number of occurrences that the at least one neighbor cell has the signal strength greater than the serving cell includes determining the number of occurrences that the at least one neighbor cell is an Nth strongest neighbor cell of a plurality of neighbor cells, and wherein N is greater than one.

8. The computer-implemented method of claim 1, wherein generating the coverage adjustment comprises generating the coverage adjustment to include instructions to uptilt an antenna of the serving cell in response to determining that a signal strength measurement of the serving cell is less than the signal strength threshold.

9. The computer-implemented method of claim 1, wherein generating the coverage adjustment comprises generating the coverage adjustment to include instructions to downtilt an antenna of the at least one neighbor cell in response to determining that a signal strength measurement of the serving cell is greater than the signal strength threshold.

10. A computing device for determining one or more tilt adjustments for cells included in a wireless communication network, the computing device comprising:
    at least one processor; and
    at least one memory coupled to the at least one processor, the at least one memory having instructions stored therein, which when executed by the at least one processor, direct the computing device to:

receive, at the computing device, geo-located traffic data associated with the wireless communication network, wherein the geo-located traffic data includes a signal strength of a serving cell and a signal strength of at least one neighbor cell of the wireless communication network;

determine a number of occurrences that the at least one neighbor cell has a signal strength greater than the serving cell based on the geo-located traffic data;

compare the signal strength of the serving cell with a signal strength threshold in response to determining that the number of occurrences is greater than a dominance threshold; and generate a coverage adjustment based on the instructions to compare the signal strength of the serving cell with the signal strength threshold, wherein the coverage adjustment includes instructions to adjust a tilt angle of an antenna included in one or more of the serving cell or the at least one neighbor cell.

11. The computing device of claim 10, wherein the geo-located traffic data includes one or more geo-located data points that comprise a first signal strength measurement of the serving cell and a plurality of second signal strength measurements of a plurality of neighbor cells, wherein the first signal strength measurement and the plurality of second signal strength measurements are performed by a user device of the wireless communication network.

12. The computing device of claim 11, wherein the first signal strength measurement and the plurality of second signal strength measurements include a signal strength measurement selected from the group consisting of: a received signal strength indicator (RSSI), a reference signal received power (RSRP), and a received channel power indicator (RCPI).

13. The computing device of claim 11, wherein each neighbor cell included in the plurality of neighbor cells of the geo-located traffic data includes an associated cell identifier, wherein at least two of the neighbor cells have a same cell identifier, and wherein the instructions are further configured to direct the computing device to:

correlate one of the two neighbor cells having the same cell identifier to a sector name of the wireless communication network.

14. The computing device of claim 13, wherein the instructions to correlate the one of the two neighbor cells having the same cell identifier to the sector name includes instructions to determine which of the two neighbor cells are located closest to a respective geo-located data point of the geo-located traffic data.

15. The computing device claim 10, wherein the instructions to determine the number of occurrences that the at least one neighbor cell has the signal strength greater than the serving cell includes instructions to determine the number of occurrences that the at least one neighbor cell is an Nth strongest neighbor cell of a plurality of neighbor cells, and wherein N is greater than one.

16. The computing device of claim 10, wherein the instructions to generate the coverage adjustment comprises instructions to:

generate the coverage adjustment to include instructions to uptilt an antenna of the serving cell in response to determining that a signal strength measurement of the serving cell is less than the signal strength threshold; and generate the coverage adjustment to include instructions to downtilt an antenna of the at least one neighbor cell in response to determining that the signal strength measurement of the serving cell is greater than the signal strength threshold.

17. One or more non-transitory computer-readable media storing computer-executable instructions, which when executed by at least one processor of a computing device, direct the computing device to:

receive, at the computing device, geo-located traffic data associated with a wireless communication network, wherein the geo-located traffic data includes a signal strength of a serving cell and a signal strength of at least one neighbor cell of the wireless communication network;

determine a number of occurrences that the at least one neighbor cell has a signal strength greater than the serving cell based on the geo-located traffic data;

compare the signal strength of the serving cell with a signal strength threshold in response to determining that the number of occurrences is greater than a dominance threshold; and generate a coverage adjustment based on the instructions to compare the signal strength of the serving cell with the signal strength threshold, wherein the coverage adjustment includes instructions to adjust a tilt angle of an antenna included in one or more of the serving cell or the at least one neighbor cell.

18. The one or more non-transitory computer-readable media of claim 17, wherein:

the instructions to determine the number of occurrences that the at least one neighbor cell has the signal strength greater than the serving cell includes instructions to determine the number of occurrences that the at least one neighbor cell is an Nth strongest neighbor cell of a plurality of neighbor cells, N is greater than one, and the instructions to generate the coverage adjustment comprises instructions to:

generate the coverage adjustment to include instructions to uptilt an antenna of the serving cell in response to determining that a signal strength measurement of the serving cell is less than the signal strength threshold, and generate the coverage adjustment to include instructions to downtilt an antenna of the at least one neighbor cell in response to determining that the signal strength measurement of the serving cell is greater than the signal strength threshold.

19. The one or more non-transitory computer-readable media of claim 17, wherein the geo-located traffic data includes one or more geo-located data points that comprise a first signal strength measurement of the serving cell and a plurality of second signal strength measurements of a plurality of neighbor cells, wherein the first signal strength measurement and the plurality of second signal strength measurements are performed by a user device of the wireless communication network.

20. The one or more non-transitory computer-readable media of claim 19, wherein each neighbor cell included in the plurality of neighbor cells of the geo-located traffic data includes an associated cell identifier, wherein at least two of the neighbor cells have a same cell identifier, and wherein the instructions are further configured to direct the computing device to:

correlate one of the two neighbor cells having the same cell identifier to a sector name of the wireless communication network.

21. The one or more non-transitory computer-readable media of claim 20, wherein the instructions to correlate the one of the two neighbor cells having the same cell identifier to the sector name includes instructions to determine which of the two neighbor cells are located closest to a respective geo-located data point of the geo-located traffic data.

* * * * *